United States Patent [19]
Hestad

[11] 3,864,530
[45] Feb. 4, 1975

[54] LINE CONTROL CIRCUIT

[76] Inventor: Alfred Hestad, 2518 N. Kilbourn, Chicago, Ill. 60639

[22] Filed: June 21, 1973

[21] Appl. No.: 372,224

[52] U.S. Cl. .......... 179/18 GE
[51] Int. Cl. .......... H04q 3/52
[58] Field of Search .......... 179/18 GE, 18 GF, 18 G, 179/18 GC, 18 H, 18 F, 18 FA, 18 FH; 340/166 R

[56] References Cited

UNITED STATES PATENTS 3,694,812 9/1972 Enomoto .......... 179/18 GF
3,706,856 12/1972 Grundy et al. .......... 179/18 GE
3,781,484 12/1973 Macrander .......... 179/18 GF

*Primary Examiner*—Thomas A. Robinson
*Attorney, Agent, or Firm*—Alter, Weiss, Whitesel & Laff

[57] ABSTRACT

Improved line circuits for use in conjunction with multi-stage networks wherein the switching elements are controlled via scanner operated control circuits. The improvements of the line circuits includes constant current sources that are common to a plurality of line circuits. The line circuits further include unique detector circuitry for determining when the matrices are fired, as well as unique line marking circuitry to provide request for service signals.

9 Claims, 2 Drawing Figures

LINE CONTROL CIRCUIT

This invention relates to circuits for use in conjunction with switching networks, and more particularly to line circuits for use in controlling such switching networks.

Among the functions of line circuits is the determination when paths have been switched through multi-stage networks. The line circuits also act to determine when the line itself is calling for service; that is, for example, when there is an off hook condition.

Each line circuit is coupled to a single entry line that is often referred to as a horizontal into the primary stage. The line circuits monitor the signal on the line to determine whether or not the line is switched through. Internally, the line circuits monitor the telephone sets to determine an off-hook condition.

Among the difficulties and adversities encountered in the use of the line circuits are undue attenuation of the communication path because of the contact thereto for the monitoring purposes.

Another difficulty confronted by line circuits connected to multi-stage switching networks is that when the line is marked to indicate a request for service, then an undue current drain is caused. This has, in the past, been overcome by providing constant current circuitry in the line circuits. However, the individual constant current circuitry has complicated all the line circuits and increased the cost per line of the network.

Accordingly, an object of this invention is to provide new and unique line circuitry for use with multi-stage switching networks.

A related object of this invention is to provide line circuits wherein the attenuation of the communication lines are minimized by isolation means used in the line circuit.

A further object of this invention is to provide line circuitry wherein minimum current drain is provided when marking the line.

A related object of this invention is to provide a common constant current source for utilization by the plurality of line circuits in marking the lines.

Yet another and related object of the invention is to provide line circuits wherein the circuitry in the line circuit used for determining when the switching network is switched through is inherently isolated from the communication path.

In a preferred embodiment of the invention the above enumerated objects and features are accomplished through the use of a plurality of line circuits utilizing a single common constant current source. The individual line circuits are connected to the matrix over a lead that is normally held at approximately ground level. A transistorized circuit indicates when the ground level changes to a positive voltage.

Figure 1:
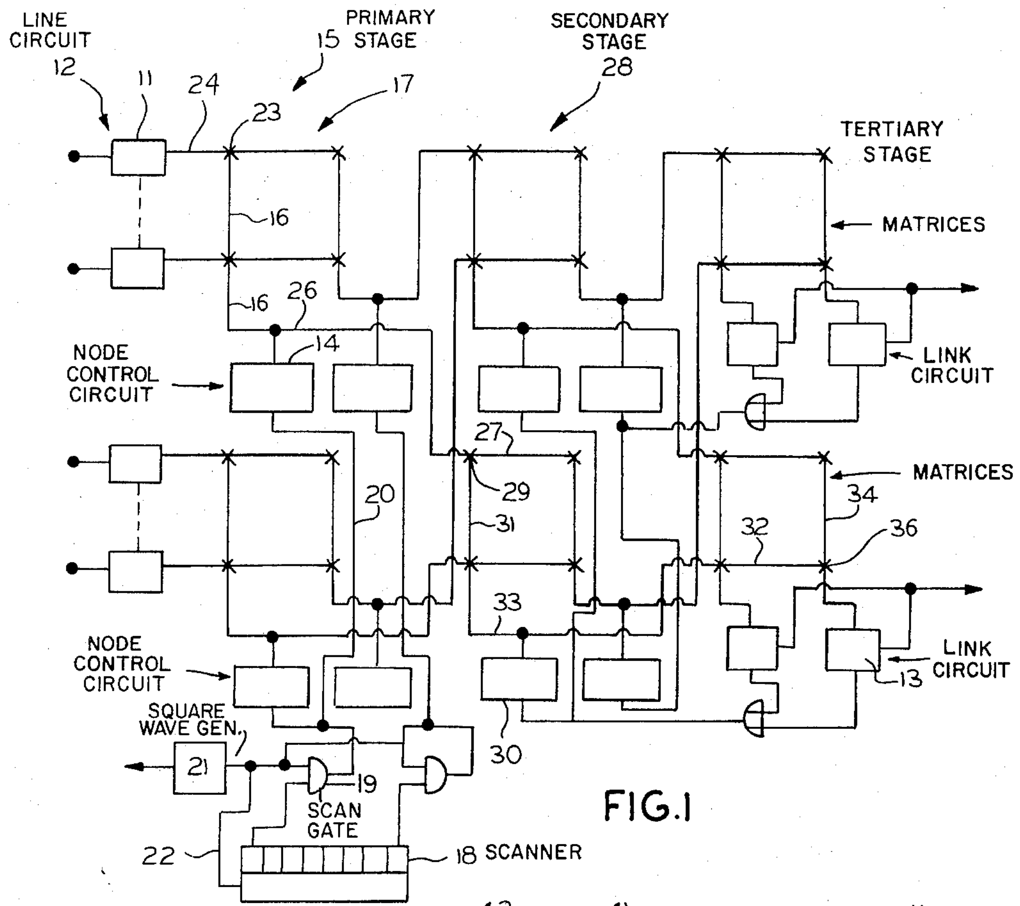
Figure 2:
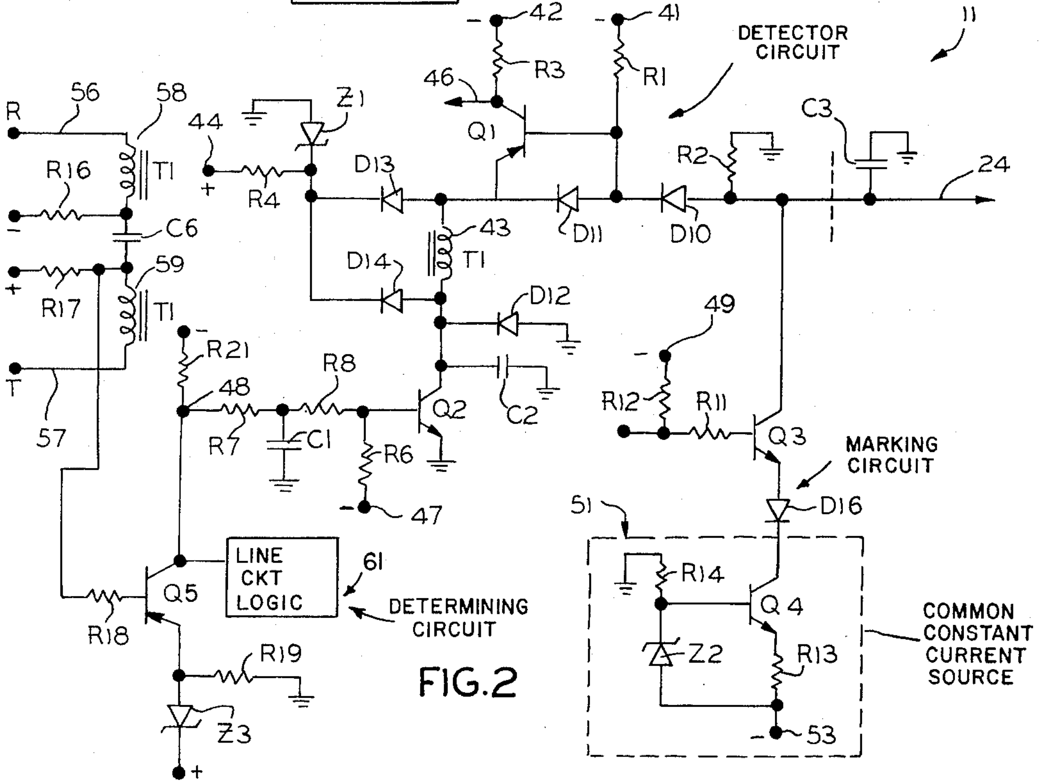

The above mentioned and other objects and features of the invention and the manner of obtaining them will become more apparent and the invention itself will be best understood by making reference to the following description of embodiments of the invention taken in conjunction with the accompanying drawings, wherein:

FIG. 1 is a block diagram of a multi-stage path selection system showing line circuits at the input and link circuits at the output; and FIG. 2 is a schematic representation of portions of a line circuit including the inventive portions and those portions necessary to understand the invention.

As shown in FIG. 1 the horizontal multiples of each stage of a multi-stage switching network are coupled to the inputs of the respective stages. The vertical multiples of each stage are shown coupled to the outputs of the respective stages. Thus, the verticals of the preceding stages are coupled to the horizontals of the succeeding stages. The cross point switching elements are shown as "X's" at the overlappings of the horizontal and vertical multiples. The switching elements can be actuated to interconnect the horizontal and vertical conductors thereat.

In practice there is usually a larger number of matrices per stage than is illustrated in FIG. 1. For purposes of simplicity in describing the invention only two of the matrices per stage are shown. Similarly, while in actuality each matrix may have a plurality of horizontals and verticals, nonetheless, only the first and last horizontals and verticals are shown. Also, while there are two appearances for each link at the output of the matrix, one, for the originating or calling party and one for the terminating or called party, for simplicity only one appearance is shown in FIG. 1.

In FIG. 1 is a circuit wherein a path is selected through the primary, secondary and tertiary stages of the switching network from a line circuit such as line circuit 11, for example, of a group of line circuits 12 to the output circuit 13 coupled to the outputs of the tertiary stage. It should be noted that while link circuits are shown as the output circuits, other type circuits, such as registers could replace the link circuits.

Means such as node control circuits are provided for enabling or blocking each of the verticals. More particularly, control circuit 14, for example, enables the first vertical 16 of matrix 17 in the primary stage 15. The node control circuits also act to block or busy out any vertical being used in a selected path.

Means are provided for actuating the node control circuits that are coupled to the verticals of the first stage. These means include the counter-type scanner, such as scanner 18. The scanner 18 sequentially actuates the control circuits coupled to the verticals of the first stage. Means are provided for preventing connections between more than one line circuit in a single vertical unless a conference call arrangement is desired. The means shown in FIG. 1 includes gates, such as gate 19 connected to the scanner 18 outputs. For example, if the telephone at the subscriber station coupled to line circuit 11 is in the off hook condition while it is scanned, a request for service signal is transmitted by the line circiut and sent to the horizontal to which the line circuit is connected.

Means are provided for driving the scanner. More particularly, the scanner is driven by a square wave generator 21 which is coupled to the scanner 18 over lead 22. The square wave generator also provides a signal for gate 19. Thus, if gate 19 is allotted by the scanner 18, then the square wave signal passes through gate 19 to the control circuit connected thereto. The square wave signal causes the control circuits to enable the switching elements, such as switching element 23 of matrix 17 in the primary stage. The switching element 23 will switch through only if a proper signal is received from line circuit 11 over horizontal 24 and from vertical 16. Thus, if horizontal 24 or vertical 16 are busy, then the switching element 23 will not switch. However, if there is a request for service signal on horizontal 24 and if vertical 16 is not busy, then element 23 will switch through. Similar switching will occur in each of the stages until a path is established from a calling line to a called line. If line circuit 11, for example, is in request for service condition, or is a called line, then line 24 connected to line circuit 11 is marked and the enabled switching element 23 will switch through to connect vertical 16 to line 24 of line circuit 11 and complete that portion of the circuit. The lead or conductor 26 is connected to the horizontal 27 in a matrix in the secondary stage 28. The cross point switching element 29 is enabled by signals from control circuit 30. If vertical 31 is not busy, then element 29 is switched to interconnect horizontal 27 and vertical 31. The vertical 31 is connected to horizontal 32 by conductor 33. Horizontal 32 is connected to vertical 34 when cross point element 36 switches under the control of link 13 to complete a path from the line circuit 11 to link circuit 13.

At the outset the line circuits, such as circuit 11, can either be in an idle condition, a busy condition, a marked condition or in an off hook condition. The signals emanating from the line circuit 11 and coupled to lead 24 vary in accordance with the condition of the line circuit. If the line circuit is the call originating line, then the line circuit is marked to switch one of the switching elements associated with horizontal 24 through when control circuit 14 is allotted. If line circuit 11 is busy, then a call has already been established and one of the switching elements, such as switching element 23 has already switched through. The line circuit supplies a signal to prevent or block any other calls from being connected to line circuit 11.

If line circuit 11 is busy, then the line circuit presents a signal to line 24 such that switching element 23 does not switch even when control circuit 14 is allotted and switching element 23 is enabled. When line circuit 11 is the calling line, then the line circuit presents a signal which causes switching element 23 to switch through when control circuit 14 is allotted to enable the switching element.

Turning to FIG. 2 the pertinent portions of the line circuit are shown to present the improvements of this invention. Where possible the same numerical designations will be used in FIG. 2 as were used in FIG. 1.

Means are provided for detecting when the line circuit is connected to a line that has been switched through from the link. More particularly, transistor Q1 normally conducts but is turned off when the matrix has been fired through from the link to the line. Transistor Q1 is a PNP transistor whose base is biased to negative voltage at point 41 through resistor R1. The biasing circuit extends from point 41 through resistor R1, diode D10 and resistor R2 to ground. The base of transistor Q1 is attached to the junction of resistor R1 and the cathode of diode D10.

The collector of transistor Q1 is biased to negative voltage at point 42 through resistor R3. The base of transistor Q1 is tied to its emitter through diode D11. The emitter is connected to ground through winding 43 of transformer T1 of the two wire balancing network and diode D12.

A regulated positive voltage is provided from positive voltage source 44, resistor R4 and zener diode Z1 to ground. The balancing network includes diode D13 connected from the top of coil 43 to the junction of resistor R4 and zener Z1. The bottom of the winding 43 is connected through diode D14 to the junction of resistor R4 and zener Z1.

The junction of resistor R2 and the anode of diode D10 is coupled to multiple 24. When the matrix is switched through, then multiple 24 is positive. The positive voltage on line 24 passes through diode D10 to the base of transistor Q1 thereby switching transistor Q1 off. The collector of transistor Q1 is connected to a circuit which responds to the change in condition of transistor Q1 over lead 46.

When the matrix is not switched through, then multiple 24 carries a negative signal and transistor Q1 remains in its normally conducting condition. The detector circuit including transistor Q1 operates independently of how the line is switched through; in other words, transistor Q1 is switched off when the matrix is switched through whether the switching is initiated or terminated by line 11.

Means are provided for indicating that the line circuit is in its on hook condition. More particularly, normally non-conducting transistor Q2 indicates that the telephone associated with this line is off hook, or that the telephone is generating dial pulses, when it is in its conductive state.

Transistor Q2 is shown as an NPN transistor. The base of transistor Q2 is normally biased to negative voltage at point 47 through resistor R6. The emitter of transistor Q2 is tied directly to ground while the collector of transistor Q2 is tied to the junction of transformer winding 43 and the cathode of diode D12.

When the telephone set goes off hook, the base of transistor Q2 is supplied with a positive signal from point 48 through resistor R7 in series with resistor R8. A filter capacitor C1 is coupled from the junction of resistors R7 and R8 to ground. In the off hook condition, the ground on the emitter of transistor Q2 is extended through the transformer winding 43, to lead 24. When the line circuit is in the on hook condition and during dial pulses, then a definite positive voltage level is placed on line 24 by the circuit including a positive voltage source, resistor R4 and zener Z1. The positive signal received over the switched through matrix enables the definite positive signal to pass through diodes D10, D11 and D13. Transistor Q1 remains on until the matrix fires. Since transistor Q1 is switched off when the matrix has fired, resistor R3 is no longer in the circuit, and therefore, it has no attenuating effect on the communication circuit.

It should be noted that diode D12 is bridged by a filter capacitor C2. The combination of the diode D12 and capacitor C2 acts to prevent adverse effects of negative transients on transistor Q2.

Means are provided for making the line. More particularly, a transistor Q3 is provided having its collector coupled directly to multiple 24. Transistor Q3 is an NPN type transistor whose base is normally biased to negative voltage at point 49 through resistors R11 and R12. The emitter of transistor Q3 is coupled to a constant current source indicated generally as 51 through a diode D16.

The constant current source includes an NPN transistor Q4. The collector of the transistor Q4 is connected to the cathode of diode D16. The emitter of transistor Q4 is connected to the negative voltage source at point 53 through resistor R13. The negative voltage source is connected to ground through zener diode Z2 in series with resistor R14. The junction of the anode of zener diode Z2 and resistor R14 is connected directly to the base of the transistor Q4.

A negative going pulse is used to mark the line. When the pulse is at its ground level and is connected to the base of transistor Q3 through resistor R11, then transistor Q3 is switched to its conducting condition and connects the output of the constant current source to the line. The constant current negative signal on the line is such that the switching element 23 will switch through when the line is so marked and the element is enabled.

Means are provided for changing the slope of the signal applied on the line in the marked condition. More particularly, a capacitor C3 is provided to vary the slope. The capacitor is especially needed when the switching element is a silicon controlled rectifier device or a similar device which has to be protected against operating on its rate effect.

In operation the transistor Q1 is conductive or non-conductive depending on the state of line 24. If line 24 carries a positive signal indicating that the matrix has been switched through, no matter how it has been switched through, then transistor Q1 is transformed to its non-conducting state.

The transistor Q2 indicates the on hook or off hook condition of the line circuit, and consequently, is responsive to dial pulses. More particularly, the line circuit includes the ring and tip leads 56, 57, respectively. The ring lead 56 is shown coupled to negative voltage through winding 58 of transformer T1 and resistor R16. The tip lead is shown coupled to positive voltage through winding 59 of transformer T1 and resistor R17. The junction of the windings 58, 59 and resistors R16, R17, respectively are coupled together through capacitor C6.

A normally non-conducting PNP transistor Q5 has its base coupled to positive voltage through resistor R17 and bias resistor R18.

The emitter of transistor Q5 is coupled to regulated positive voltage provided at the junction of zener diode Z3 and resistor R19. The emitter of the transistor Q5 is coupled to point 48 and to negative voltage through resistor R21, also coupled to point 48.

When the hook switch is up or the dial is operated, then the ring and tip leads are connected together so that the positive bias of the base of transistor Q5 is removed. Consequently, the transistor Q5 conducts and places a positive bias on the base of transistor Q2 to cause it to conduct. It should be noted that other line circuit logic, not material to this invention, is coupled to the collector of transistor Q5, for example, as indicated by box 61.

Transistor Q3 conducts when the line circuit is marked to apply a signal to line 24 from a constant current source. The constant current source is common to a plurality of line circuits thereby simplifying the circuitry of each of the individual line circuits.

While the principles of the invention have been described above in connection with specific apparatus and applications, it is to be understood that this description is made only by way of example, and not as a limitation on the scope of the invention.

I claim:

1. An improved line circuit arrangement for use in conjunction with multi-stage switching networks, said arrangement including a plurality of line circuits, at least some of said line circuits connected to a first stage switching matrix of the multi-stage switching network over a first multiple, at least some of said line circuits including detector means connected to said first multiple operating to determine when a path is switched through said switching network, said detector means operative when the telephone associated with a line circuit having a detector means is in the off hook or the on hook condition, making means operated responsive to the operation of said detector means for marking said first multiple, and said marking means comprising a constant current source common to a plurality of said line circuits.

2. The improved line circuit arrangement of claim 1 including means for normally holding said first multiple at approximately ground level until said network is switched through.

3. The improved line circuit arrangement of claim 1 wherein determining means are provided for determining when the telephone set associated with said line circuit presents a request for service signal.

4. The improved line circuit arrangement of claim 1 wherein said detector means comprises a first transistor coupled to said first multiple in a manner so that it conducts when the network is not switched through and is turned off responsive to a path being switched through the network.

5. The improved line circuit arrangement of claim 4 wherein capacitor timing means are provided for varying the slope of the marking signal produced by said marking means.

6. The improved line circuit arrangement of claim 1 wherein switching means are provided between said constant current source and said first multiple.

7. The improved line circuit arrangement of claim 6 wherein said switching means comprises a constant current control transistor that is normally off, and said constant current control transistor being switched to the conducting state by a mark pulse.

8. The improved line circuit arrangement of claim 7 wherein means are provided responsive to dial pulses for grounding said first multiple.

9. A path selecting system for selecting a path from an input circuit requesting service to an allotted output circuit through a multi-stage network, each of said stages comprising a plurality of matrices, each of said matrices comprising a plurality of overlapping input and output multiples, means for linking the output multiples of the preceding stages to the input multiples of the succeeding stages, means for linking each of the plurality of said input circuits to at least one input multiple of the first of said stages, means for linking each of a plurality of said output circuits to at least one output multiple of the last of said stages, solid state cross point elements coupled between said input and said output multiples at the points of overlapping, said cross point elements capable of being switched between a conducting state and a non-conducting state to interconnect said overlapping multiples in the conducting state and to disconnect said overlapping multiples in the non-conducting state, a control circiut attached to each output multiple linked to a succeeding stage, said control circuit selectively enabling said cross point switching elements, said enabling means operated responsive to said control circuit being allotted, said input circuits comprising line circuits, said line circuits having means for applying a marking signal to the input multiples to which said line circuits are attached to operate cross point elements connected thereto which are enabled, and said marking means including a constant current derived from a source common to a plurality of said line circuits.

* * * * *

UNITED STATES PATENT OFFICE
CERTIFICATE OF CORRECTION

Patent No. 3,864,530 Dated February 4, 1975

Inventor(s) Alfred M. Hestad

It is certified that error appears in the above-identified patent and that said Letters Patent are hereby corrected as shown below:

Col. 4, line 54 Change "making" to -- marking --

Col. 6, line 11 Change "making" to -- marking --

Signed and sealed this 20th day of May 1975.

(SEAL)
Attest:

RUTH C. MASON
Attesting Officer

C. MARSHALL DANN
Commissioner of Patents
and Trademarks